US006371467B1

(12) United States Patent
Nishimoto et al.

(10) Patent No.: US 6,371,467 B1
(45) Date of Patent: Apr. 16, 2002

(54) MOVABLE CLAMPING APPARATUS

(75) Inventors: Toshinao Nishimoto; Hironori Yamada; Tsutomu Shirakawa, all of Kobe (JP)

(73) Assignee: Kabushiki Kaisha Kosmek, Hyogo (JP)

( * ) Notice: Subject to any disclaimer, the term of this patent is extended or adjusted under 35 U.S.C. 154(b) by 0 days.

(21) Appl. No.: 09/718,356

(22) Filed: Nov. 24, 2000

(51) Int. Cl.[7] .................................................. B23Q 3/08
(52) U.S. Cl. .......................................................... 269/32
(58) Field of Search ............................ 269/32, 99, 100, 269/93, 94, 238

(56) References Cited

U.S. PATENT DOCUMENTS 5,692,982 A 12/1997 Kayatani et al.

FOREIGN PATENT DOCUMENTS

| | | |
|---|---|---|
| JP | 60-136826 | 9/1985 |
| JP | 10-231911 | 9/1988 |

*Primary Examiner*—Robert C. Watson
(74) *Attorney, Agent, or Firm*—Bacon & Thomas, PLLC

(57) ABSTRACT

A bolster of a press machine has a T-shaped groove, into which a T-shaped leg of a hydraulic clamp is fitted. The clamp advances and retreats along the T-shaped groove by a pneumatic cylinder. A housing of the clamp has a side surface to which a block is fixed. The block is provided with a hydraulic locking device. When placing the clamp in a waiting condition at a retreated position, a push piston of the locking device is projected downwards from a retracted position. Then the push piston pushes an upper surface of the bolster and the thus resulting reaction force fixes the T-shaped leg to a peripheral wall of the T-shaped groove.

14 Claims, 5 Drawing Sheets

MOVABLE CLAMPING APPARATUS

BACKGROUND OF THE INVENTION

1. Field of the Invention

The present invention relates to a movable clamping apparatus and more particularly to an apparatus which comprises a clamp provided on a slide and a bolster of a press machine or the like pedestal so as to be able to advance and retreat and locks the clamp at a retreated position.

2. Explanation of Related Art

A movable clamping apparatus of this type needs to be provided with a means for locking a clamp at a retreated position in order to prevent the clamp waiting at the retreated position from rattling due to vibration caused during a press working. Conventionally known as the locking means are a first prior art disclosed in Japanese Utility Model Public Disclosure No. 60-136826 and a second prior art recited in Japanese Patent Public Disclosure No. 10-231911.

The first prior art (UM Public Disclosure No. 60-136826) inserts a T-shaped leg of a clamp into a T-shaped groove of a slide of a press machine so that it can advance and retreat by a push-pull chain and pushes a dummy block provided laterally and outwardly of a starting end portion of the T-shaped groove through the clamp when having retreated the clamp to a waiting position.

According to the first prior art, the dummy block projects laterally and outwardly of the starting end portion of the T-shaped groove. Therefore, a movable clamping apparatus becomes large in shape and weight by an amount corresponding to the projection. This decreases a working space around the movable clamping apparatus to result in lowering the workability.

The second prior art (Patent Public Disclosure No. 10-231911) attaches a receiving block to a lateral and external side of a lower portion of a slide of a press machine and fits a T-shaped leg of a clamp into a T-shaped groove of the slide and a T-shaped groove of the receiving block movably. And it pushes the T-shaped leg of the clamp to the receiving block by pulling the clamp to a retreated position through a push-pull chain.

The second prior art need not be provided with the dummy block of the first prior art and therefore is excellent in that it can make the movable clamping apparatus compact and light by an amount corresponding to the omission of the dummy block. However, in order to attach the receiving block to the slide, the slide must be machined. Therefore, it takes labor to effect the machining. On this point, the second prior art has to be still improved.

SUMMARY OF THE INVENTION

The present invention has an object to provide a movable clamping apparatus which can increase a working space therearound and be easily attached.

In order to accomplish the object, the present invention has constructed a movable clamping apparatus in the following manner, for example, as shown in FIGS. 1 to 4 or in FIG. 5.

A clamp 5 has a housing 10 from which an engaging portion 11 projects. The engaging portion 11 is fitted into an engaging groove 2 of a pedestal 1, thereby enabling the clamp 5 to advance and retreat along the engaging groove 2. The clamp 5 is provided with a clamping piston 19 which moves relatively to the housing 10 and with a clamp member 6 to be driven by the piston 19. The clamp 5 is also provided with a locking means 8.

By switching over a push member 48 of the locking means 8 from a retracted position (N) to a projected position (M), the push member 48 at the projected position (M) pushes the pedestal 1, thereby fixing the engaging portion 11 to a peripheral wall of the engaging groove 2.

The present invention produces the following function and effect.

When placing the clamp in a waiting condition, it is sufficient if first, the clamp is moved to a retreated position by a fluid pressure cylinder and the like moving means or manually. Then the push member of the locking means pushes the pedestal and the thus resulting reaction force pushes the engaging portion to the engaging groove. This fixes the clamp to the pedestal through the engaging portion.

In this case, the clamp is provided with the locking means. Therefore, differently from the first prior art and the second prior art, it is possible to prevent the projection of the dummy block and the receiving block from the slide and the like pedestal.

This can increase the working space around the movable clamping apparatus to result in enhancing the workability.

Further, according to the present invention, the locking means is provided with or in the clamp. In consequence, differently from the second prior art, it is unnecessary to machine the slide and the like pedestal and besides to form an oil pressure passage, an air pressure passage and the like for driving the locking means in the pedestal. This facilitates the attachment of the movable clamping apparatus.

In addition, the present invention can further retreat the clamp by an amount corresponding to a space for installing the block required in each of the above-mentioned prior arts, which results in enlarging an allowance size for attaching a metal mold and the like object to be fixed.

The present invention includes various kinds of movable clamping apparatuses.

In one movable clamping apparatus, the locking means comprises a fluid pressure cylinder. When the clamping piston has moved for clamping with pressurized fluid, the pressurized fluid switches over the push member to the projected position. The apparatus can make a pressure supplying circuit for clamping of the clamp, common with a pressure supplying circuit for locking of the locking means. This results in the possibility of manufacturing whole the apparatus in compact size with a simple structure.

Further, as for the locking means, two cases are considered. In one case, it is attached to an outer surface of the housing of the clamp and in the other case, it is provided within the housing.

Moreover, it is preferable to provide a moving means for advancing and retreating the clamp and to connect an operation portion of the moving means to the housing. And it is also preferable if the moving means is constructed by a fluid pressure cylinder and the operation portion is composed of a piston rod.

BRIEF DESCRIPTION OF THE DRAWINGS

FIG. 1 is an elevational view of a movable clamping apparatus;

FIG. 2 is a plan view of the clamping apparatus shown in FIG. 1;

FIG. 3 is a right side view of the clamping apparatus shown in FIG. 1;

FIG. 4 shows a locking means provided in the clamping apparatus and is an enlarged sectional view of an essential part in FIG. 3.

DESCRIPTION OF THE PREFERRED EMBODIMENTS

A first embodiment shown in FIGS. 1 to 4 exemplifies a case where a movable clamping apparatus is attached to a press machine.

A bolster (pedestal) 1 of the press machine has an upper surface opened to provide a T-shaped groove (engaging groove) 2. A lower die 3 is placed on the upper surface of the bolster 1. The lower die 3 can be fixed to the bolster 1 by a plurality of movable clamping apparatuses 4, only one set of which is illustrated here.

Figure 1:
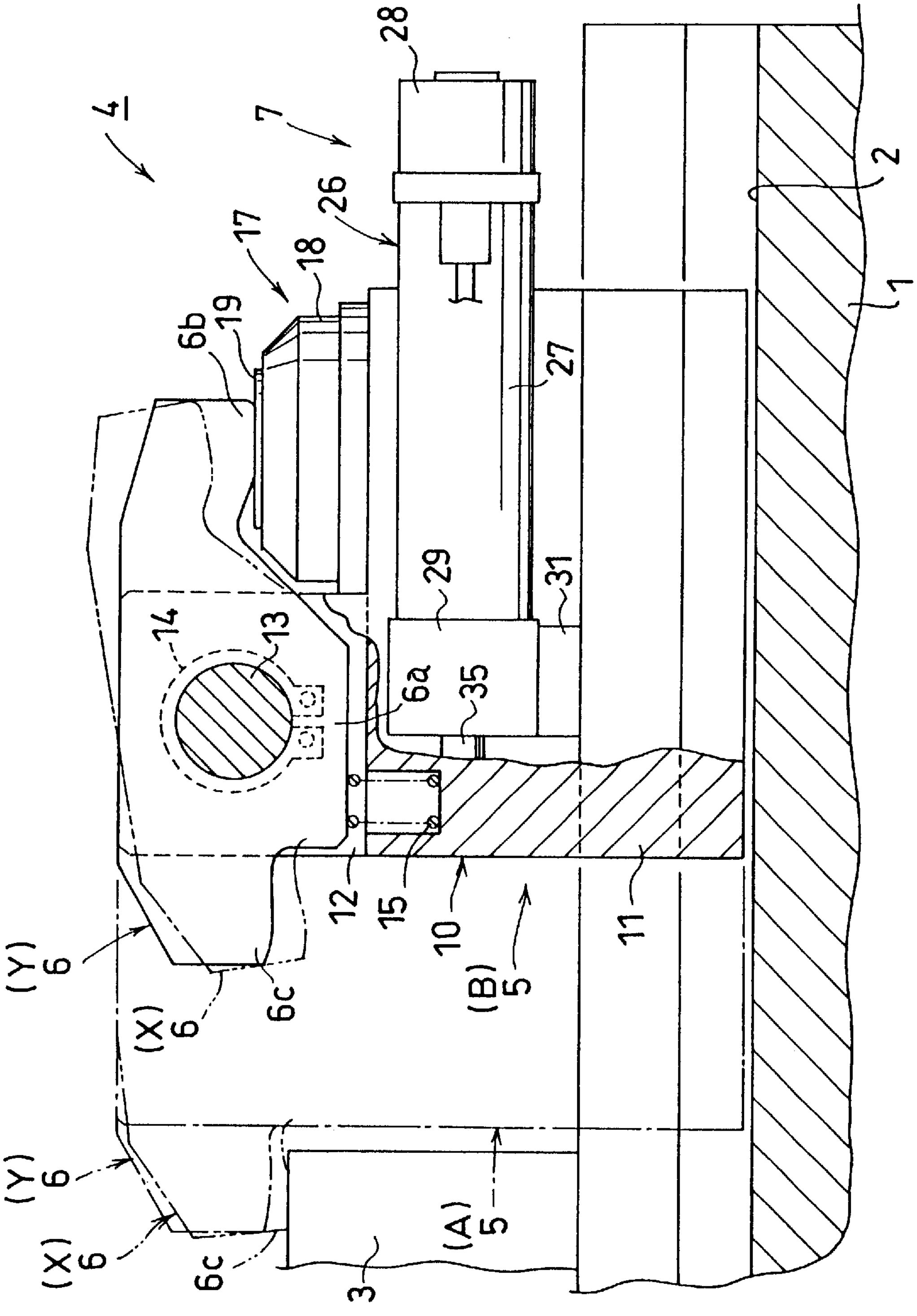
FIGS. 1 to 4 show a first embodiment of the present invention.

The clamping apparatus 4 comprises a hydraulic clamp 5 having a clamp member 6, a pneumatic moving means 7 which advances and retreats the clamp 5 along the T-shaped groove 2, and a hydraulic locking means 8 provided with the clamp 5. And as shown in FIG. 1, the clamp 5 is moved from an advanced position (A) indicated by one-dot chain line to a retreated position (B) designated by full line through the moving means 7 and is retained at the retreated position (B) through the locking means 8 as mentioned later.

The clamp 5 is constructed as follows.

A housing 10 of the clamp 5 has a lower portion from which a T-shaped leg (engaging portion) 11 projects downwards and is fitted into the T-shaped groove 2. The housing 10 has an upper portion from which a pair of support walls 12,12 projects upwards. A shaft 13 spans between the paired support walls 12,12 and has opposite ends to which snap rings 14,14 are attached in fitting relationship. The clamp member 6 has a fulcrum portion 6*a* supported by the shaft 13 swingably in a vertical direction. The clamp member 6 is urged toward an unclamping position (Y) (see a view designated by full line in FIG. 1) through a push spring 15.

A cylinder barrel 18 of a clamping hydraulic cylinder 17 is hermetically fixed to the upper portion of the housing 10. A clamping piston 19 is hermetically inserted into the cylinder barrel 18. The piston 19 has an upper portion brought into contact with an input portion 6*b* of the clamp member 6. The piston 19 has a lower side on which a clamping hydraulic chamber 20 is formed. The hydraulic chamber 20 is communicated with a pressurized oil supply and discharge port 21. The piston 19 is urged downwards by a return spring 22.

The moving means 7 has a pneumatic cylinder 26 and is constructed as follows.

The pneumatic cylinder 26 comprises a cylinder tube 27 as well as a head cover 28 and a rod cover 29 fixed to opposite ends of the cylinder tube 27. The rod cover 29 is fixed to the bolster 1 through two bolts 30 shown in FIG. 2. Numeral 31 in FIGS. 1 and 3 indicates a height adjusting base plate. A bracket 34 is fixed to one side surface of the housing 10 of the clamp 5 through other two bolts 33. Connected to the bracket 34 is a front end of a piston rod 35 of the pneumatic cylinder 26.

The bracket 34 engages with a proximity switch 37 in screw-thread fitting. The head cover 28 is provided with a first air connection port 38 for advancing and the rod cover 29 is provided with a second air connection port 39 for retreating.

Figure 2:
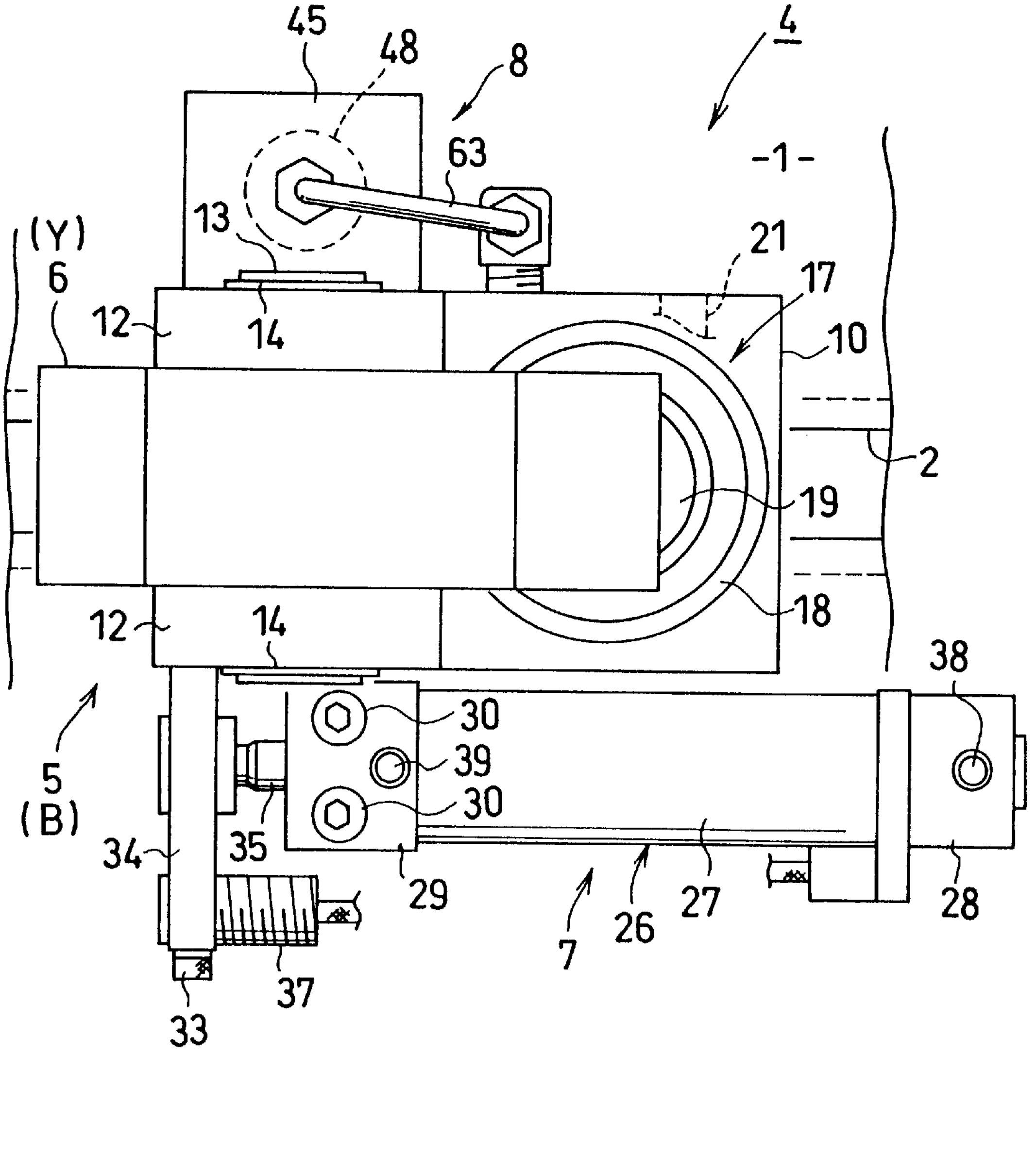
Figure 3:
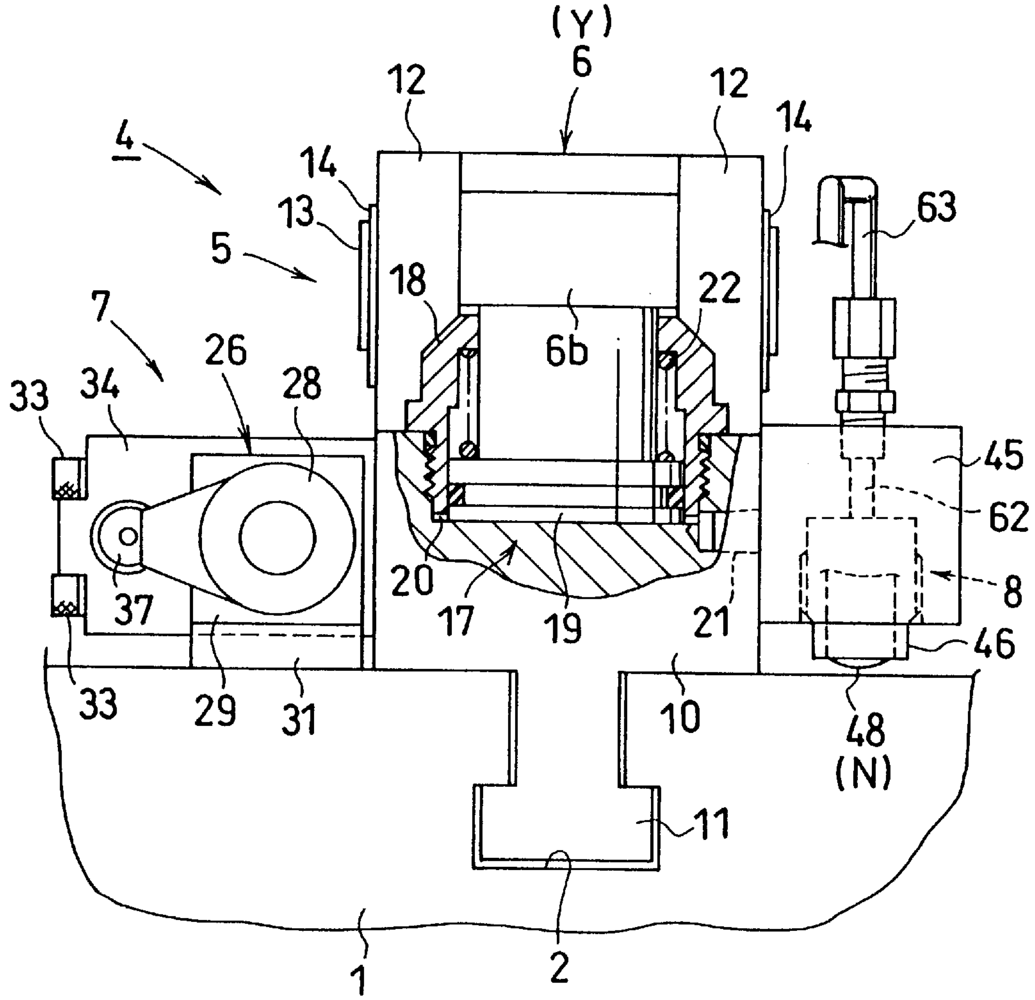
Figure 4:
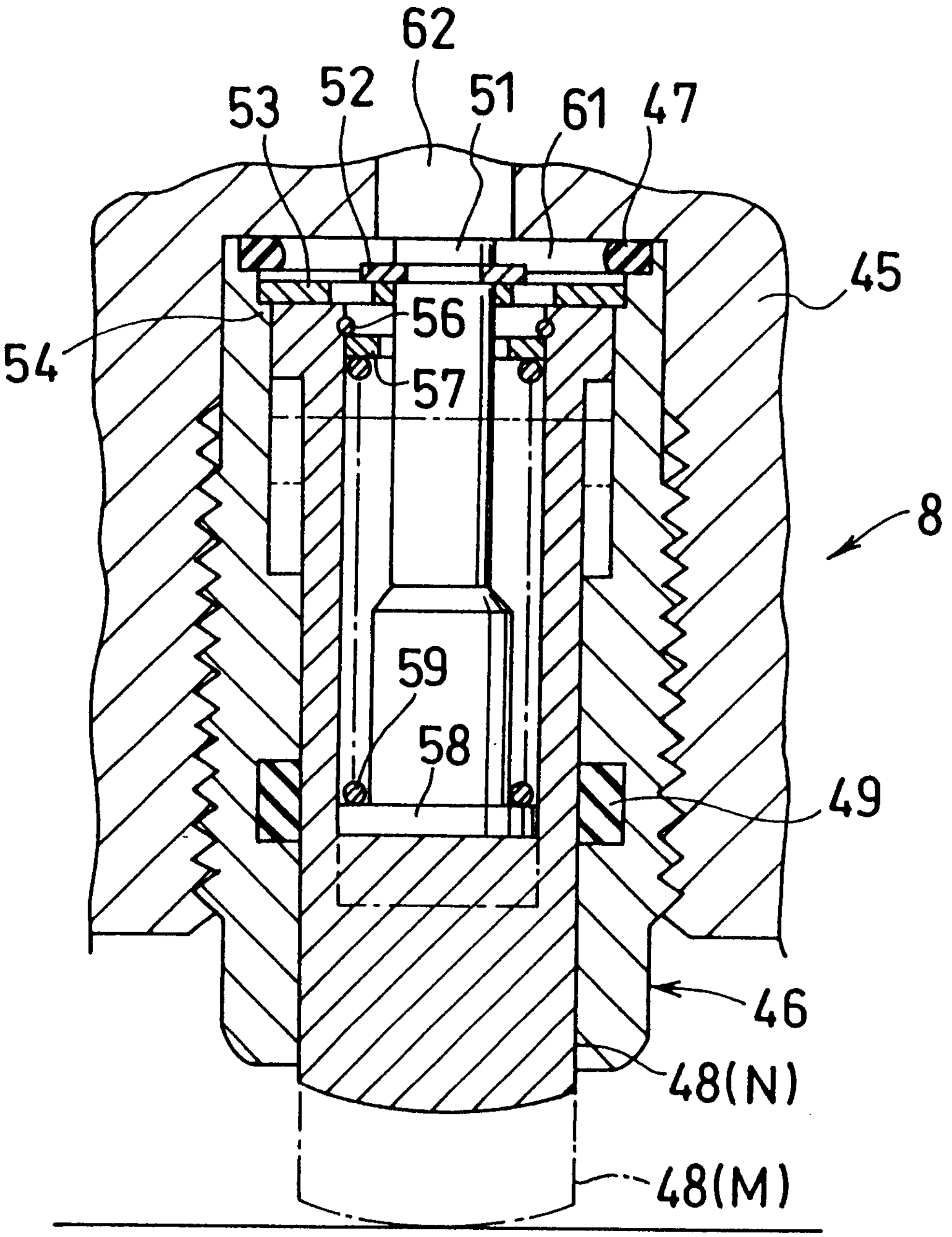

The construction of the locking means 8 is explained by relying on FIG. 4 with reference to FIGS. 2 and 3.

The housing 10 has the other side surface to which a block 45 is fixed. The block 45 has a lower half portion to which a threaded sleeve 46 is hermetically fixed through an O-ring 47. A push piston 48, a push member, is hermetically inserted into the threaded sleeve 46 through a sealing member 49.

The push piston 48 has a hollow portion. A support rod 51 is inserted into the hollow portion. The support rod 51 has an upper end supported by a stepped portion 54 of the threaded sleeve 46 through a snap ring 52 and a receiving plate 53. The hollow portion of the push piston 48 has an upper end which supports a spring retainer 57 through another snap ring 56. A retracting spring 59 is attached between the spring retainer 57 and a lower flange 58 of the support rod 51.

Further, the push piston 48 has an upper side on which a locking hydraulic chamber 61 is formed. The locking hydraulic chamber 61 is communicated with the clamping hydraulic chamber 20 of the clamp 5 via an oil passage 62 within the block 45, an oil pressure piping 63 and an oil passage (not shown) within the housing 10.

And when pressurized oil is supplied to the locking hydraulic chamber 61, the push piston 48 is lowered to a projected position (M) (see a view designated by one-dot chain line in FIG. 4) with oil pressure force acting on a sealing sectional area of the sealing member 49. When the pressurized oil is discharged from the locking hydraulic chamber 61, the push piston 48 is raised to a retracted position (N) (see a view indicated by full line in FIG. 4) by the retracting spring 59.

The movable clamping apparatus 4 operates in the following manner mainly as shown in FIG. 1.

In a state designated by full line in FIG. 1, the pressurized oil is discharged from the pressurized oil supply and discharge port 21 (see FIG. 2) of the clamp 5. This lowers the clamping piston 19 by the return spring 22 to switch over the clamp member 6 to an unclamping position (Y) through the push spring 15 and the push piston 48 to the retracted position (N) through the retracting spring 59.

When fixing the lower die 3, first, the pneumatic cylinder 26 is extended, thereby moving the clamp 5 through the piston rod 35 of the pneumatic cylinder 26 to an advanced position (A) designated by one-dot chain line. The proximity switch 37 controls an advancing amount of the clamp 5. Next, the pressurized oil is supplied to the supply and discharge port 21. Then the clamping piston 19 strongly rises to swing the clamp member 6 to a clamping position (X) indicated by two-dot chain line. This allows an output portion 6c of the clamp member 6 to push and fix the lower die 3 to the upper surface of the bolster 1.

When cancelling the clamping condition, it suffices if first, the pressurized oil is discharged through the supply and discharge port 21 to switch over the clamp member 6 to the unclamping position (Y) and then the pneumatic cylinder 26 is contracted to move the clamp 5 by the piston rod 35 to a retreated position (B).

In the event that only a specific clamp 5 among a plurality of clamps 5 is made to wait at the retreated position (B) on the bolster 1, it is sufficient if the pressurized oil is supplied to the supply and discharge port 21 in the state designated by the full line in FIG. 1. Then oil pressure force of the clamping hydraulic chamber 20 enables the clamping piston 19 to switch over the clamp member 6 to the clamping position (X) and at the same time oil pressure force of the locking hydraulic chamber 61 switches over the push piston 48 to the projected position (M). Therefore, the push piston 48 at the projected position (M) pushes the upper surface of the bolster 1 and the thus resulting reaction force pushes the T-shaped leg 11 to a peripheral wall of the T-shaped groove 2. This strongly retains the clamp 5 on the bolster 1 through the T-shaped leg 11, which results in the possibility of preventing the shifting displacement of the clamp 5, which is waiting at an end of the bolster 1, due to vibration caused during a press working.

The above-mentioned movable clamping apparatus 4 is exemplified in the case where it is attached to the bolster 1. But, of course, it can be attached to a slide (not shown).

Further, the locking means 8 may be fixed to the other side surface or a rear end surface of the housing 10 instead of its one side surface.

Figure 5:
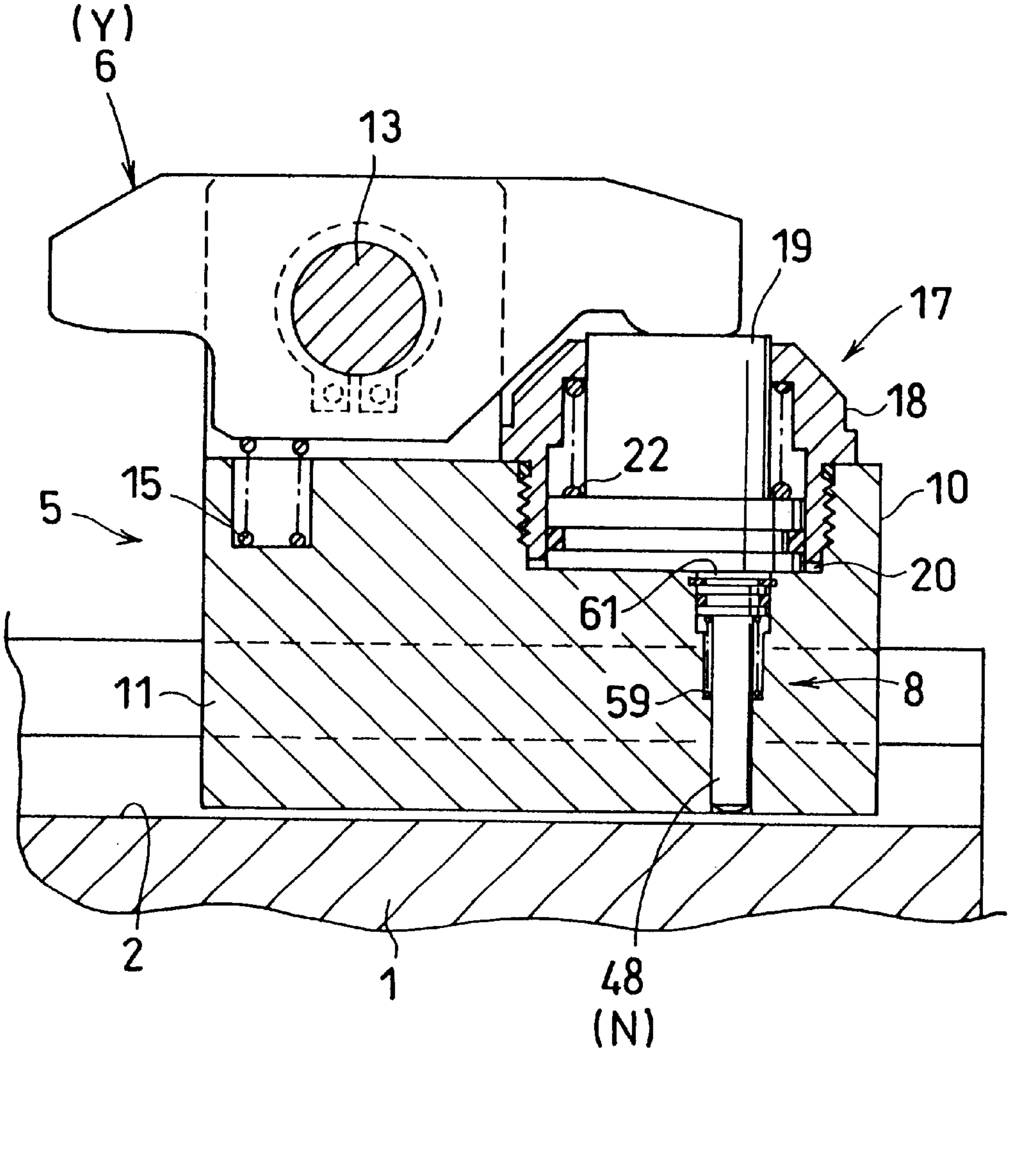
FIG. 5 shows a second embodiment of the present invention and is a view similar to FIG. 1.

FIG. 5 shows a second embodiment and is a view similar to FIG. 1. In the second embodiment, the same constituent members as those in the first embodiment are, in principle, explained by putting the same characters.

In this case, the locking means 8 is provided within the housing 10. More specifically, the clamping hydraulic cylinder 17 has a lower side into which the push piston (push member) 48 is hermetically inserted. The locking hydraulic chamber 61 provided on the upper side of the push piston 48 is directly communicated with the clamping hydraulic chamber 20. The push piston 48 is switched over to the illustrated retracted position (N) by the retracting spring 59. The clamp 5 is made to advance and retreat by the same moving means (not shown here) as that used in the first embodiment.

The respective embodiments can be modified as follows.

The locking means 8 may be constructed by a cylinder of spring-locking and hydraulic-return type and besides a cylinder of double-acting type instead of the exemplified cylinder of hydraulic-locking and spring-return type.

The locking means 8 may be composed of a pneumatic cylinder instead of the exemplified hydraulic cylinder and besides may utilize other type of actuator such as an electric motor and a piezoelectric element.

The moving means 7 may employ a hydraulic cylinder and an electric motor instead of the exemplified pneumatic cylinder 26 and besides may use a chain, a rope and the like of push-pull type.

The moving means 7 may be omitted and instead the clamp 5 may be advanced and retreated by hand of a worker.

The working machine to which the movable clamping apparatus of the present invention is attached may be an injection molding machine, a machining center and the like instead of the exemplified press machine.

In the case where the T-shaped groove is not formed in the pedestal of the working machine, it is sufficient if a guide block provided with a corresponding T-shaped groove is attached to the pedestal and the T-shaped leg 11 of the clamp 5 is fitted into the T-shaped groove of the guide block. This enables the clamp 5 to advance and retreat over the pedestal through the guide block.

The structure for engaging the clamp 5 with the pedestal so as to be able to advance and retreat is not limited to the exemplified engagement of the T-shaped groove 2 with the T-shaped leg 11. But, of course, it is possible to utilize combinations of engaging grooves which have various shapes in section with engaging portions which have also various shapes in section.

Further, the clamp member 6 and the clamping piston 19 of the clamp 5 may be connected to each other via at least one other member instead of directly as exemplified.

What is claimed is:

1. A movable clamping apparatus comprising:

a clamp which includes a housing, an engaging portion projecting from the housing and fitted into an engaging groove of a pedestal, a clamping piston moving with respect to the housing, and a clamp member driven by the piston, the engaging groove having a peripheral wall, the clamp advancing and retreating along the engaging groove through the engaging portion;

a locking means provided with or in the clamp and having a push member which is switched over to a retracted position and to a projected position; and when the push member is switched over from the retracted position to the projected position, the push member at the projected position pushing the pedestal to thereby fix the engaging portion to the peripheral wall of the engaging groove.

2. The movable clamping apparatus as set forth in claim 1, wherein the locking means is composed of a fluid pressure cylinder and when the clamping piston has moved for clamping with pressurized fluid, the pressurized fluid switches over the push member to the projected position.

3. The movable clamping apparatus as set forth in claim 1, wherein the locking means is attached to an outer surface of the housing.

4. The movable clamping apparatus as set forth in claim 1, wherein the locking means is provided within the housing.

5. The movable clamping apparatus as set forth in claim 1, wherein there is provided a moving means for advancing and retreating the clamp, the moving means having an operation portion, which is connected to the housing.

6. The movable clamping apparatus as set forth in claim 5, wherein the moving means is constructed by a fluid pressure cylinder and the operation portion is composed of a piston rod.

7. The movable clamping apparatus as set forth in claim 2, wherein the locking means is attached to an outer surface of the housing.

8. The movable clamping apparatus as set forth in claim 2, wherein the locking means is provided within the housing.

9. The movable clamping apparatus as set forth in claim 2, wherein there is provided a moving means for advancing and retreating the clamp, the moving means having an operation portion, which s connected to the housing.

10. The movable clamping apparatus as set forth in claim 3, wherein there is provided a moving means for advancing and retreating the clamp, the moving means having an operation portion, which is connected to the housing.

11. The movable clamping apparatus as set forth in claim 4, wherein there is provided a moving means for advancing and retreating the clamp, the moving means having an operation portion, which is connected to the housing.

12. The movable clamping apparatus as set forth in claim 9, wherein the moving means is constructed by a fluid pressure cylinder and the operation portion is composed of a piston rod.

13. The movable clamping apparatus as set forth in claim 10, wherein the moving means is constructed by a fluid pressure cylinder and the operation portion is composed of a piston rod.

14. The movable clamping apparatus as set forth in claim 11, wherein the moving means is constructed by a fluid pressure cylinder and the operation portion is composed of a piston rod.

* * * * *